United States Patent [19]

Köhler et al.

[11] 4,318,843
[45] Mar. 9, 1982

[54] INORGANIC PIGMENTS WITH IMPROVED GLOSS AND GOOD DISTRIBUTION IN LACQUER BINDERS

[75] Inventors: Klaus Köhler; Peter Woditsch; Heribert Stütgens; Eckhard Bayer; Klaus Nollen; Hans Sander, all of Krefeld, Fed. Rep. of Germany

[73] Assignee: Bayer Aktiengesellschaft, Leverkusen, Fed. Rep. of Germany

[21] Appl. No.: 159,745

[22] Filed: Jun. 16, 1980

[30] Foreign Application Priority Data

Jun. 20, 1980 [DE] Fed. Rep. of Germany ....... 2924850

[51] Int. Cl.³ .......................... C09C 3/08; C09C 3/10; C09C 3/12
[52] U.S. Cl. ..................................... 523/212; 106/262; 106/299; 106/300; 106/308 N; 106/308 Q; 524/267; 524/247; 524/249
[58] Field of Search ............... 106/262, 308 N, 308 Q, 106/299, 300; 260/22 A, 40 R, 42.44, 22 CQ, 21, 42.21

[56] References Cited

U.S. PATENT DOCUMENTS

| | | | |
|---|---|---|---|
| 1,848,213 | 3/1932 | Wiegand | 106/308 N |
| 3,015,569 | 1/1962 | Frieser | 106/308 N |
| 3,172,772 | 3/1965 | Rowe | 106/308 N |
| 3,345,187 | 10/1967 | Binnis | 106/308 N |
| 3,506,466 | 4/1970 | Bramekamp et al. | 106/308 N |
| 3,536,510 | 10/1970 | Allen et al. | 106/308 N |
| 3,567,680 | 3/1971 | Iannicelli | 106/308 N |
| 3,649,588 | 3/1972 | Kennedy-Skipton | 106/308 Q |
| 3,849,152 | 11/1974 | Mimeault | 106/308 Q |
| 4,061,503 | 12/1977 | Berger et al. | 106/308 Q |
| 4,167,423 | 9/1979 | Williams | 106/308 Q |

FOREIGN PATENT DOCUMENTS 2012017 10/1970 Fed. Rep. of Germany .
825404 12/1959 United Kingdom .
959211 5/1964 United Kingdom .

Primary Examiner—Ronald W. Griffin
Attorney, Agent, or Firm—Sprung, Felfe, Horn, Lynch & Kramer

[57] ABSTRACT

An inorganic pigment exhibiting improved gloss and distribution in lacquer binders, carrying a coating comprising a SiOH-containing organosilicon compound and an alkanolamine. Advantageously the alkanolamine comprises at least one of triethanolamine, triisopropanolamine, diethanolamine, diisopropanolamine and 2-amino-2-methyl-propanol-1, the organosilicon compound is of the formula

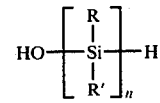

wherein $n > 3$, R and $R^1$ each independently is alkyl, cycloalkyl, aryl, alkenyl or a group of the formula

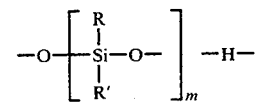

wherein $m > 1$, the organosilicon compound having an OH:Si ratio within the range of about 1:1 to 1:20, and the pigment comprises $TiO_2$ or a titanate carrying an inorganic coating, the organosilicon compound plus alkanolamine ranging from about 0.3 to 1% by weight of the organosilicon compound to alkanolamine ranging from about 1:2 to 1:5.

10 Claims, No Drawings

INORGANIC PIGMENTS WITH IMPROVED GLOSS AND GOOD DISTRIBUTION IN LACQUER BINDERS

The present invention relates to inorganic pigments having improved gloss and distribution in lacquer binders by means of treatment with organic auxiliaries before or during final micronization.

Fog-free high gloss coatings and good subdivision in lacquer binders are important requirements of high quality pigments. In addition to certain other properties such as good resistance to weathering and brightening capacity, they constitute important criteria for assessing quality. There has been no lack of attempts in the past to achieve the above object. The characteristic procedure to achieve this object in many patents is that of rendering the organophobic surface of the pigment organophilic by means of suitable substances such as organic auxiliaries which are added before or during the milling operation which concludes the production process. This milling of the pigments is generally carried out in pin mills, ball mills or ring roll mills but exceptionally high quality pigments are obtained by micronization in fluid energy mills, e.g. using air jets or stream jets. Numerous organic compounds are known as auxiliaries for modifying the surface of pigments. Apart from polyols, alkene oxides, phenols, long chain fatty alcohols and fatty acid esters, to name but a few of the classes of compounds which may be used, it is also known to use organosilicon compounds. The object of using these organosilicon compounds is to render the pigments or fillers hydrophobic and to make them more readily dispersible and capable of incorporation in synthetic resins. In German Offenlegungsschrift No. 2 012 017, for example, there is described the treatment of $TiO_2$ with sodium methyl siliconate to improve its dispersibility in polystyrene. It is also customary to render pigments hydrophobic by treating them with polysiloxanes, e.g. octamethylcyclotetrasiloxane (British Pat. No. 959,211) to improve their incorporation in polyamides, or to treat them with silanes such as trialkoxysilanes for example, as described in British Pat. No. 825,404. Such surface treatments are not however, capable of producing pigments with excellent fog-free gloss in lacquer binders.

Organic treatment of pigments with alkanolamines is also known. The use of trialkanolamines and, diisopropanolamine, for example, have been described in U.S. Pat. No. 3,345,187 and in German Pat. No. 2 442 678, respectively. In the process according to German Offenlegungsschrift No. 1 792 022, triethanolamine is brought into contact with the pigment surface in the course of so-called double steam jet milling. U.S. Pat. No. 2,737,460 is concerned with the milling of pigments with trialkanolamines in the presence of finely divided fillers such as Aerosil. It is also known to use salts of alkanolamines with organic acids such as lactic acid (German Pat. No. 1 271 862) or benzoic acids (U.S. Pat. No. 3,712,772).

The procedures mentioned above are either expensive or technically complicated or else result in pigments which, in spite of showing distinct improvements compared with titanium dioxides which have not been organically treated, do not satisfy the highest standards of quality demanded with regard to gloss and fineness of subdivision and dispersion. This applies particularly to pigments which have been after-treated with $SiO_2$ or $Al_2O_3$.

It has now surprisingly been found that pigments with improved gloss and good distribution in lacquer binders can easily be obtained by treatment with organic auxiliaries before their final micronization if a combination of alkanolamines with organic silicon compounds containing SiOH groups is used. The present invention provides inorganic pigments with improved gloss and subdivision in lacquer binders, having a coating of organosilicon compounds containing SiOH groups and having more than three Si atoms in the molecule and alkanolamines; and a process for the preparation thereof by coating the pigments with the above mentioned compounds before or during their final micronization. Pigments which ae particularly suitable for this treatment are white pigments based on $TiO_2$ or titanates, including also those which have been subjeccted to an inorganic after-treatment. The new pigments are particularly suitable for pigmenting polymer materials and aqueous suspensions.

The pigments are brought into contact with about 0.1 to 4%, preferably about 0.3 to 1% of the organic auxiliaries. It has been found advantageous to use a proportion by weight of SiOH-containing organic silicon compounds to alkanolamine within the range of about 1:1 to 1:10 particularly of about 1:2 to 1:5. The SiOH-containing organic silicon compounds are characterized by an OH:Si ratio within the range of about 1:1 to 1:20, preferably of about 1:2 to 1:10. Examples include linear and branched chain organic silicon compounds corresponding to the following formula

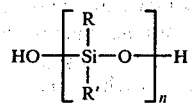

wherein n>3, and R' may be the same as or different from R. R may be an alkyl and/or a cycloalkyl and/or and aryl and/or an alkenyl group or a group corresponding to the following formula

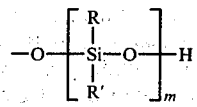

where m>1.

Specific fractions of the hydrolyzates of, for example, the following compounds are suitable: Dimethyldichlorosilane; dimethyldichlorosilane and methyl trichlorosilane; dimethyldichlorosilane and silicon tetrachloride; vinyl methyl dichlorosilane; vinyl methyl dichlorosilane and dimethyldichlorosilane, cyclohexylmethyldichlorosilane and dimethyldichlorosilane; and the like. Condensation products of diphenylsilanediol are also suitable.

Particularly suitable compounds include, for example, linear polymethylsiloxanes end-blocked with SiOH groups having an average molecular weight of about 490 and a viscosity of about 27 cP; also linear polyvinylmethylsiloxanes end-blocked with SiOH groups having a (MeSiViO) content of about 5%, a (SiOH) content of about 18.2% and a viscosity of about 25.5 cP. Branched chain polymethylsiloxanes end blocked with SiOH groups, an average molar weight of about 545 and a viscosity of about 110 cP as well as branched chain polyvinylmethylsiloxanes end-blocked with SiOH groups having a (MeSiViO) content of about 5% a (SiOH) content of about 15.2% and a viscosity of about 96 cP are also suitable.

Common to all the above compounds is a certain ratio of OH groups to Si atoms which in the process according to the present invention should be within the range of from 1:1 to 1:20 if optimum pigment properties are to be obtained.

The alkanolamines used may be trialkanolamines, dialkanolamines and/or monoalkanolamines. The following are particularly suitable: Triethanolamine, triisopropanolamine, diisopropanolamine, 2-amino-2-methyl-1-propanol, 2-amino-2-hydroxy-methyl-1,3-propanediol, 2-dimethylaminoethanol, 2-ethylaminoethanol and the like. The organic auxiliaries are brought into contact with the pigment in known manner, either before or during a final milling operation. It is immaterial whether they are mixed with the moist filter cake obtained in the course of preparation of the pigment or with pastes or sludges of the pigment before drying, whether they are directly added to the dry substance in some suitable manner before the final milling, for example by spraying or else whether, for example in the case of steam jet milling, they are directly added to the steam before it is fed into the jet mill. The effectiveness of the compounds used according to the present invention does not depend upon the sequence in which the components are added. Regardless of whether mixtures of alkanolamines and organosilicon compounds are added or whether alkanolamines are added first, followed by organosilicon compounds, or vice-versa, the pigments obtained show considerable improvement in gloss, fogging and granularities after they have been micronized compared with products which have only been treated with alkanolamines alone or with organosilicon compounds alone.

There is thus obviously a synergistic effect between these two substances, as can be seen from Table 1 hereinafter.

The process of the present invention is suitable for all inorganic white and colored pigments. Particularly advantageous results are obtained with white pigments based on TiO$_2$ or titanates or with iron oxides. The pigments may also have undergone an inorganic after-treatment. Pigments with excellent gloss and good distribution are obtained by the process according to the present invention.

TiO$_2$ pigments of both the rutile or anatase form obtained by the sulphate process and those obtained by the TiCl$_4$ combustion process may be treated according to the present invention. In the examples described in detail below, TiO$_2$ pigments which have been treated with inorganic compounds are surface treated with the organic auxiliaries according to the present invention.

A furnace clinker, for example is obtained after several preliminary stages, and this clinker is milled and graded. The fine fraction is subjected to an inorganic after-treatment, which may consist of the precipitation of compounds such as Al(OH)$_3$, SiO$_2$ or TiO$_2$ on the surface thereof and may be carried out by various methods in suspension. The inorganically after-treated pigment sludge is freed from water in a rotary filter and washed. The residue on this first rotary filter may be mixed with water and transferred to a second rotary filter. The residue (II) from this second filter is also washed, and then dried on a drying belt or a spray drier.

When the pigments have been dried, they are broken down either by milling in a jet mill, e.g. an air jet mill, or a steam jet mill, or in a milling apparatus which has a compacting effect, such as a Raymond mill, a ball mill or a pin mill. The organic auxiliaries according to the present invention may be brought into contact with the pigment at various stages before or during micronization. For example, they may be added to the second filter residue (II) after it has been washed but before it is dried. They may also be added to the dry pigment substance, e.g. by spraying, immediately before it is micronized. Another treatment method consists of adding the compounds used according to the present invention to the steam or air fed into the jet mill. The organic auxiliaries according to the present invention may be added advantageously as mixtures since this ensures the desired constant ratio of alkanolamine to organosilicon compounds.

According to another variation of the process of the present invention, the organosilicon compound containing SiOH groups is added to the filter residue (II) after it has been washed and before it is dried, and the alkanolamine is added to the dry pigment by spraying before it is milled, or else it is brought into contact with the pigment together with the steam or air.

The above means that the combination of organic auxiliaries may be added to the pigment separately at various stages of the manufacturing process.

To test the pigment for gloss and distribution in lacquer binders, it is dispersed by a dissolver. This dispersion is produced in a highly viscous mixture of binder solution of 60% alkyd resin (ricinene-modified alkyd resin, oil length 35; trade product Alkydal R 35 of BAYER AG) in xylene under the following conditions:

| | |
|---|---|
| Volumetric concentration of pigment in material to be ground (PVK): | 37.6% |
| Diameter of dissolver disc | 3.5 cm = D |
| Diameter of container: | 5.5 cm = 1.57 D |
| Distance of dissolver disc from bottom: | 1.75 cm = 0.5 D |
| Height to which the container is filled with material to be ground | 3.5 cm = D |
| Peripheral speed of dissolver disc: | 11 m/s |
| Dispersion time: | 5 minutes. |

Samples are removed after a dispersion time of 5 minutes and lacquered to a PVK of 15% with the alkyd resin and a melamine resin (Maprenal MF 800, trade product of Hoechst AG) so that the ratio of alkyd resin to melamine resin is 77:23. The degree of fineness of the dispersion is determined in the usual manner with a grindometer (DIN 53 203). The lacquers prepared in this way are then applied to glass plates to form films 120 μm when wet, and are hardened at 120° C. for 30 minutes. The gloss is measured with a Gonio photometer at an angle of 25°. The height of the peak at the reflection maximum is a measure of the gloss obtained while the height of the scatter curve 1° next to the reflection maximum is a measure of the gloss fog values.

A high gloss lacquer is characterized by high gloss values and low gloss fog values.

The preparation of the pigments according to the present invention is described below by way of example.

EXAMPLE 1

A TiO$_2$ pigment having a rutile structure and prepared by the sulphate process was after-treated inorganically with 3.8% SiO$_2$ and 4% Al$_2$O$_3$ and dried after the usual washing and filtration. The pigment was sprayed with 0.1% by weight (based on dry pigment) of an α,ω-polysiloxanediol mixture having an average molecular weight of 490 and a viscosity of 27 cP and 0.3% of triethanolamine and then micronized in a jet mill using superheated steam. The dispersibility, gloss and gloss-fog values are shown in Table 1.

(Comparison Example A)

This comparison Example A shows that a pigment obtained when triethanolamine alone is used is qualitatively considerably inferior.

The rutile pigment described in Example 1 is sprayed with 0.4% triethanolamine after drying and is then micronized in a jet mill as described in Example 1. The dispersing properties are shown in Table 1.

(Comparison Example B)

This comparison example shows that the use solely of an organic Si compound containing SiOH groups also results in a qualitatively inferior pigment. The rutile pigment described in Example 1 is dried and then sprayed with 0.4% of an α,ω-polysiloxanediol mixture having an average molecular weight of 490 and a viscosity of 27 cP and micronized. See Table 1.

EXAMPLE 2

After drying, the rutile pigment as used in Example 1 is sprayed with 0.17% of an α,ω-polysiloxanediol mixture having an average molecular weight of 490 and a viscosity of 27 cP and 0.53% of triethanolamine and milled in a steam jet mill; see Table 1.

EXAMPLE 3

The rutile pigment as used in Example 1 is dried and then sprayed with 0.12% of an α,ω-polysiloxane diol mixture having an average molecular weight of 490 and a viscosity of 27 cP and 0.58% of triethanolamine and milled in a steam jet mill; see Table 1.

EXAMPLE 4

The washed filter cake of the rutile pigment as used in Example 1 is mixed, before drying, with 0.12% by weight (based on the dry pigment) of a branched chain SiOH-containing organosilicon compound having an average overall formula of TD$_{6.56}$ and containing 14% of SiOH groups. After the pigment has been dried, it is sprayed with 0.48% triethanolamine and micronized as described in the previous example; see Table 1.

EXAMPLE 5

The rutile pigment as used in Example 1 is sprayed after drying with a mixture containing 0.12% by weight (based on the dry pigment) of a polysiloxanediol mixture having an average molecular weight of 490 and a viscosity of 27 cP and 0.48% by weight (based on dry pigment) of 2-amino-2-methyl-1-propanol and then milled in a steam jet mill as described in Example 1; see Table 1.

EXAMPLE 6

The rutile pigment as described in Example 1 does not receive an organic after-treatment.

TABLE 1

| Example | Organic Treatment | Gloss (%) | Fog (%) | Grind-ometer value (μ) | Hegman value |
|---|---|---|---|---|---|
| 1 | 0.1% Si-org. cpd. and 0.3% triethanolamine | 87 | 26 | 16 | 6.7 |
| Comparison Example A | 0.4% triethanolamine | 77 | 37 | 20 | 6.4 |
| Comparison Example B | 0.4% Si-org. cpd. | 70 | 40 | 16 | 6.7 |
| 2 | 0.17% Si-org. cpd. and 0.53% triethanolamine | 85 | 24 | 16 | 6.7 |
| 3 | 0.12% Si-org. cpd. and 0.58% triethanolamine | 87 | 24 | 16 | 6.7 |
| 4 | 0.12% branch chained Si-org.cpd. and 0.48% triethanolamine | 88 | 23 | 14 | 6.9 |
| 5 | 0.12% Si-org. cpd. and 0.48% 2-amino-2-methyl-1-propanol | 86 | 25 | 14 | 6.9 |
| 6 | None | 49 | >100 | 38 | 40 |

It will be appreciated that the instant specification and examples are set forth by way of illustration and not limitation, and that various modifications and changes may be made without departing from the spirit and scope of the present invention.

We claim:

1. An inorganic pigment with improved gloss and distribution in a lacquer binder having a coating of a SiOH-containing organosilicon compound with more than three Si atoms and an alkanolamine.

2. An inorganic pigment according to claim 1 wherein the quantity of SiOH-containing organosilicon compound and of alkanolamine is from about 0.1% to 3% based on the weight of the pigment, and the ratio by weight of SiOH-containing organosilicon compound to alkanolamine is from about 1:1 to 1:10.

3. An inorganic pigment according to claim 1, comprising TiO$_2$ or a titanate.

4. An inorganic pigment according to claim 1, wherein the organosilicon compound is of the formula

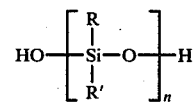

wherein n>3, R and R$^1$ each independently is an alkyl cycloalkyl, aryl alkenyl or a group of the formula

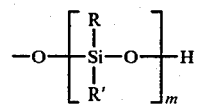

wherein m>1, the organosilicon compound having an OH:Si ratio within the range of about 1:1 to 1:20.

5. An inorganic pigment according to claim 1, wherein organosilicon compound is of the formula

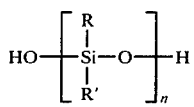

wherein n>3, R and R¹ each independently is methyl, ethyl, phenyl or a group of the formula

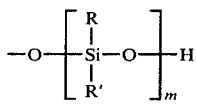

wherein m>1, the SiOH-containing organosilicon compound having an OH:Si ratio within the range of about 1:1 to 1:20.

6. An inorganic pigment according to claim 1, wherein the alkanolamine comprises at least one of triethanolamine, diethanolamine, triisopropanolamine, diisopropanolamine and 2-amino-2-methyl-propanol.

7. An inorganic pigment according to claim 6, wherein the organosilicon compound is of the formula

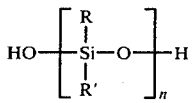

wherein n>3, R and R¹ each independently is methyl, ethyl, phenyl or a group of the formula

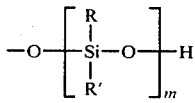

wherein m>1, the SiOH-containing organosilicon compound having an OH:Si ratio within the range of about 1:2 to 1:10, and the pigment comprises $TiO_2$ or a titanate carrying an inorganic coating, the organosilicon compound plus alkanolamine ranging from about 0.3 to 1% by weight of the pigment and the ratio by weight of the organosilicon compound to alkanolamine ranging from about 1:2 to 1:5.

8. In the preparation of an inorganic pigment wherein the pigment is produced by chemical reaction and is thereafter micronized, the improvement which comprises mixing with the pigment before or during micronization an SiOH-containing organosilicon compound with more than three Si atoms and an alkanolamine.

9. A process according to claim 8, wherein the alkanolamine comprises at least one of triethanolamine, diethanolamine, triisopropanolamine, diisopropanolamine and 2-amino-2-methylpropanol, the organosilicon compound is of the formula

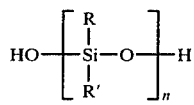

wherein n>3, R and R¹ each independently is methyl, ethyl, phenyl or a group of the formula

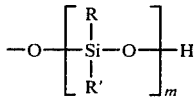

wherein m>1, the SiOH-containing organosilicon compound having an OH:Si ratio within the range of about 1:2 to 1:10, and the pigment comprises $TiO_2$ or a titanate carrying an inorganic coating, the organosilicon compound plus alkanolamine ranging from about 0.3 to 1% by weight of the pigment and the ratio by weight of the organosilicon compound to alkanolamine ranging from about 1:2 to 1:5.

10. A polymeric material pigmented with a pigment according to claim 1.

* * * * *